June 9, 1964  S. A. HUMPHREY  3,136,250
INTEGRATED AUXILIARY POWER UNIT
Filed May 4, 1962
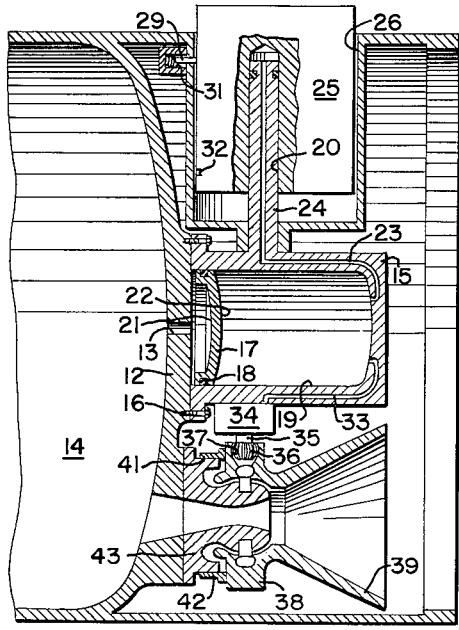
FIG.1.
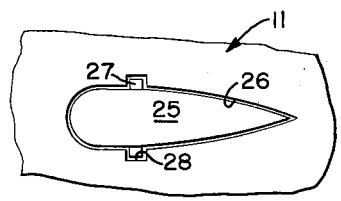
FIG.2.
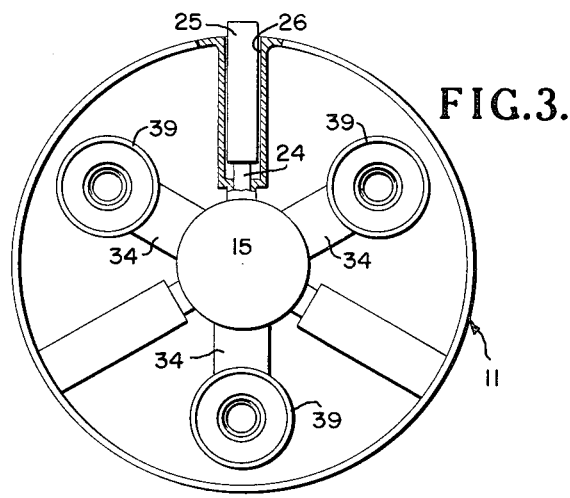
FIG.3.
FIG.4.
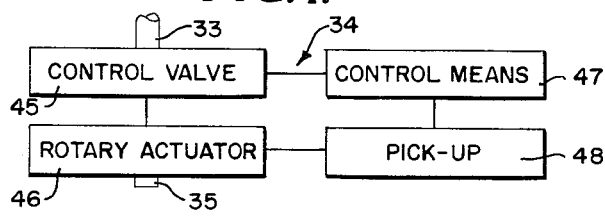
INVENTOR.
SAMUEL A. HUMPHREY
BY *D. Hodges*
ATTY.
*Frank P. Presto* AGENT.

United States Patent Office 3,136,250
Patented June 9, 1964

3,136,250
INTEGRATED AUXILIARY POWER UNIT
Samuel A. Humphrey, Silver Spring, Md., assignor to the United States of America as represented by the Secretary of the Navy
Filed May 4, 1962, Ser. No. 193,078
1 Claim. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

This invention relates to an auxiliary power unit for a missile and more particularly to an integrated auxiliary power unit which provides rotational forces for thrust vectoring nozzles of a guided missile and actuating stabilizing fins of the missile during flight.

In the field of missile control, it has been the general practice to employ linear actuators to drive thrust vectoring jetevators mounted on the nozzles. Since there was a slight movement of the actuators whenever the jetevators were moved, flexible hydraulic lines were a necessity. This flexible plumbing created a space problem since high pressure fittings were necessary and the flexible lines could only be bent to certain minimum radii. In addition, the flex lines were partially exposed to radiated heat from the exhaust and therefore were always subject to damage. A further problem in prior art missile control systems was the use of folding stabilizing fins which imparted an undesired aerodynamic or hydrodynamic rolling moment to the missile when they were extended and also had an inherent lack of reliable operation since the operating forces required were large.

The general purpose of this invention is to provide an auxiliary power unit for a missile which embraces all of the advantages of prior art devices and possesses none of the aforedescribed disadvantages. In the present invention, by using rotary rather than linear actuators, it is possible to connect them to the oil supply in such a way that drilled passages are used instead of flexible lines for the plumbing. This provides for more available space and allows for the use of hydraulically operated and radially extendible stabilizing fins. These fins are also mounted rigidly with respect to the oil supply chamber and are fed by drilled passage plumbing, with the result that an integrated auxiliary power unit is provided.

An object of the present invention is the provision of an improved auxiliary power unit for a missile of the character described.

Another object is to provide an integrated auxiliary power unit which eliminates a number of additional pieces of hardware, decreases heat damage susceptibility and and improves reliability of operation.

A further object is the provision of rotary actuators for the missile thrust vectoring nozzles so as to eliminate flexible hydraulic lines which are susceptible to damage by the radiated heat from the missile exhaust.

Still another object is to provide radially extendible, hydraulically actuated stabilizing fins instead of folding fins which have the disadvantage of imparting an undesired aerodynamic or hydrodynamic rolling moment to the missile when they are extended.

A still further object is the provision of drilled passages for the oil supply instead of flexible plumbing to avoid the problem of heat damage susceptibility and to provide for more available space in the missile.

Other objects and various further features of novelty and invention will be apparent to those skilled in the art from a reading of the following specification and claims in conjunction with the accompanying drawings, which show, for illustrative purposes only, a preferred form of the invention in which:

FIG. 1 shows a side elevational view, partly in section, of a preferred embodiment of the invention;

FIG. 2 illustrates a plan view of a portion of the apparatus shown in FIG. 1;

FIG. 3 is a rear elevational view, partly in section, of the apparatus shown in FIG. 1; and FIG. 4 is a diagrammatic view of the nozzle actuating and control unit shown generally in FIG. 1.

In the illustrated example of the invention, and referring first to FIGS. 1 and 3, the reference numeral 11 designates the rocket housing which has a dividing wall 12 formed integrally therewith or rigidly attached thereto. An aperture 13 is provided in the dividing wall to allow communication between the combustion chamber 14 and a cylindrical casing 15 which is rigidly attached to the dividing wall 12 by bolts 16. A piston 17 is slidably mounted within the casing 15 and is provided with an O-ring 18 so as to be in sealing relationship with the inner wall 19 of the casing 15. Because of the aperture 13 in the dividing wall 12, the surface 21 of the piston 17 is subjected to the rocket motor gas pressure from the combustion chamber 14. The casing 15 is partially filled with a suitable hydraulic fluid such as oil which contacts the surface 22 of the piston 17.

Drilled passages 23 are provided in the casing 15 and extend into and through radially disposed rod-like members 24 of circular cross section which are rigidly attached to the casing 15 or formed integrally therewith. Stabilizing fins 25 have center passages 20 to receive the longitudinal members 24 in slidable and sealing relationship. As shown in FIG. 2, the fins 25 are slidably received in fin-shaped openings 26 in the rocket housing 11 and are provided with lateral extensions 27 extending longitudinally thereon and slidably received in longitudinal grooves 28 formed on either side of each opening 26. Any suitable means such as shear pins or wires (not shown) may be used to normally retain the fins 25 within the openings 26. To retain the fins in a fully radially extended position, spring biased bolts 29 are provided in recesses 31 in the rocket housing 11 to be received in recesses 32 in each of the fins 25.

Drilled passages 33 are provided in the casing 15 to supply hydraulic pressure to nozzle actuating and control units 34 shown generally in FIG. 1 and to be described in more detail hereinafter with respect to FIG. 4. A rotatable shaft 35 is connected to each of the actuating and control units 34 and has a splined end portion 36 having a slightly curved outer surface. The end portion 36 engages a splined, curved inner surface on one of the laterally extending portions 38 at the neck of each of the thrust vectoring nozzles 39. The laterally extending portions 38 are rotatably received in U-shaped members 41 and 42 that are rigidly mounted on the nozzle throat members 43 which are in turn rigidly attached to the dividing wall 12. The thrust vectoring nozzles 39 are therefore mounted for pivotal movement within the U-shaped members 41 and 42 and are pivoted by rotation of the rotatable shaft 35.

Referring now to FIG. 4, the components of the nozzle actuating and control units 34 are shown in diagrammatic form. The hydraulic pressure from each of the drilled passages 33 in the casing 15 is admitted into a control valve 45 which functions to control the flow of fluid to a hydraulic rotary actuator 46 to which is connected one of the rotatable shafts 35. The control valve 45 and rotary actuator 46 may be of any suitable or well known construction such as that shown in the patent to Van Voorhees, 2,984,221, issued May 16, 1961. To control the position of the valve 45 and therefore the movement of the rotary actuator 46, control means 47 are provided, and a pickup mechanism 48 is utilized to record the position of the rotary actuator 46 and relay this position back to the control means 47 for the purpose of checking the proper position of each of the thrust vectoring nozzles 39. The control means 47 and pickup 48 may be of any suitable or conventional construction such as that used in the electro-hydraulic servo unit disclosed in the patent Teague, Jr. 2,628,594, issued February 17, 1953. It is to be noted that the particular construction and operation of the components of the nozzle actuating and control units 34 form no part of the present invention. Any type of hydraulically operated, rotary actuating and control unit could be used.

In operation, when the rocket motor is ignited, the rocket motor gas pressure will be transmitted through the aperture 13 and act on the surface 21 of the piston 17 and cause the piston to slide within the cylindrical casing 15 to increase the hydraulic pressure of the oil within the casing 15 and in contact with the surface 22 of the piston. The hydraulic pressure increased in the casing 15 will be transmitted by the drilled passages 23 to the longitudinal rod-like members 24 upon which the stabilizing fins 25 are slidably mounted. The increased hydraulic pressure will cause the fins 25 to move radially outwardly from the rocket housing 11 and the fins will be locked in position when fully extended by the spring biased bolts 29 when they are received in the fin recesses 32. The drilled passages 33 transmit the increased hydraulic pressure from the casing 15 to the actuating and control units 34 for each of the thrust vectoring nozzles 39. Within each of the actuating and control units 34, the control valve 45 transmits the hydraulic pressure to the rotary actuator 46 to change its position in response to the operation of the pickup mechanism 48 and control means 47. Therefore, the position of each of the rotatable shafts 35 and thrust vectoring nozzles 39 can be controlled hydraulically in response to each of the actuating and control units 34 respectively.

The present invention, therefore, provides an auxiliary power unit for a missile in which all of the components may be assembled into an integrated unit to eliminate a number of additional pieces of hardware, decrease damage susceptibility and improve reliability of operation-features which are very important in missile construction and control.

While the invention has been described in detail for the preferred form shown, it will be understood that modifications may be made within the scope of the invention as defined in the appended claim.

What is claimed is:

In a missile having a rocket motor for generating propulsive gases, a rocket motor housing, a casing having an open end mounted on said housing to receive a portion of the propulsive gases and having a closed end adjacent which said casing is partially filled with a hydraulic fluid, a piston slidably mounted within said casing and operated by the propulsive gases to pressurize the fluid in said casing, a plurality of thrust vectoring nozzles pivotally mounted on said housing, rotary actuating and hydraulic control units rigidly mounted on said casing and each operatively connected respectively to each of said nozzles for the pivotal actuation thereof, a plurality of fin-shaped recesses in said housing, rod-like members each having a drilled passage therethrough formed integral with and laterally extending from said casing into said recesses, stabilizing fins slidably mounted in said recesses and each having a longitudinal bore to slidably receive one of said rod-like members therein, and a plurality of drilled passages in said casing extending from the closed end thereof to said actuating and control units and to said passages of said rod-like members for delivering pressurized fluid thereto for the actuation of said nozzles and said fins respectively.

References Cited in the file of this patent
UNITED STATES PATENTS

| | | |
|---|---|---|
| 2,249,729 | Fitzurka | July 22, 1941 |
| 2,723,528 | Stark et al. | Nov. 15, 1955 |
| 2,743,072 | Emmi | Apr. 24, 1956 |
| 3,004,734 | Radford | Oct. 17, 1961 |